(12) United States Patent
Noguchi et al.

(10) Patent No.: US 6,522,291 B1
(45) Date of Patent: Feb. 18, 2003

(54) GPS RECEIVER SHARING AN ANTENNA GROUND PLANE WITH AN EMI SHIELD

(75) Inventors: Takahide Noguchi, Hikone (JP); Katsuya Yamamoto, Hikone (JP); Yuichiro Naoi, Hikone (JP); Koji Yamamoto, Hikone (JP); Hideki Oka, Hikone (JP); Hiroki Nishimoto, Hikone (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 09/716,451

(22) Filed: Nov. 21, 2000

(30) Foreign Application Priority Data

Dec. 10, 1999 (JP) .......................................... 11-352286
May 19, 2000 (JP) ........................................ 2000-148935
May 19, 2000 (JP) ........................................ 2000-148936

(51) Int. Cl.$^7$ ............................. H04B 7/185; G01S 5/02
(52) U.S. Cl. .................................. 342/357.06; 701/213
(58) Field of Search .................... 342/357.06; 701/213; 343/700 MS

(56) References Cited

U.S. PATENT DOCUMENTS 6,091,358 A * 7/2000 Maniscalco et al. ...... 342/357.1
6,202,008 B1 * 3/2001 Beckert et al. ............... 701/33
6,272,349 B1 * 8/2001 McGrath et al. ............ 455/456

\* cited by examiner

Primary Examiner—Theodore M. Blum
(74) Attorney, Agent, or Firm—Rader, Fishman & Grauer PLLC

(57) ABSTRACT

A compact GPS receiver includes a GPS antenna composed of a patch and a ground plane to receive high frequency satellite signals, an analog circuit which processes the high frequency satellite signals into a digital signal, a digital circuit which processes the digital signal to compute positional coordinates of the GPS antenna, and an interface connector which outputs the positional coordinates to an external device. A substrate is provided to support the GPS antenna, the analog circuit, the digital circuit, and the interface connector. An EMI (electromagnetic interference) shield is provided to shield at least the digital circuit to block a noise developing at the digital circuit from interfering with the GPS antenna. The GPS antenna is mounted on the EMI shield to share the ground plane with the EMI shield, while keeping the patch insulated electrically from the EMI shield. Thus, the GPS receiver can be made compact by making the use of the EMI shield also as the ground plane of the antenna, while assuring to block the noise from interfering with the antenna and affording sufficient antenna gain with the increased ground plane.

15 Claims, 10 Drawing Sheets

♦ patch centered on ground plane
● patch offset on ground plane

GPS RECEIVER SHARING AN ANTENNA GROUND PLANE WITH AN EMI SHIELD

BACKGROUND OF THE INVENTION

1. Field of the Invention

The present invention relates to a GPS receiver, and more particularly to a compact GPS receiver which has a GPS antenna sharing a ground plane with an EMI shield of an electric circuit which processes satellite signals.

2. Description of the Prior Art

A GPS receiver is basically composed of an antenna unit for receiving high frequency satellite signals and a processing unit for processing the signals to compute positional coordinates of the GPS receiver. The processing unit includes an analog circuit which is responsible for amplifying the HF satellite signal, reducing the HF signal to an intermediate frequency signal, and converting the signal into a digital signal. Also included in the processing unit is a digital circuit which processes the digital signal to compute the positional coordinates of the GPS receiver. Since the digital circuit handles the digital signal, it is a source of developing a noise which interferes with the antenna and impedes the antenna gain. In order to avoid the interference, the digital circuit has to be surrounded by an EMI (electromagnetic interference) shield. On the other hand, the antenna unit is required to have increased area of ground plane for improving the antenna gain. However, in a prior GPS receiver in which the antenna unit is provided separately from the processing unit, it is difficult to make the whole assembly of the GPS receiver compact enough to be easily carried on, while affording the increased antenna's ground plane for improved antenna gain in addition to providing the EMI shield of sufficient dimensions for successfully shielding the digital circuit.

SUMMARY OF THE INVENTION

In view of the above insufficiency, the present invention has been accomplished to provide a GPS receiver which can be made compact to be sufficiently portable. The GPS receiver in accordance with the present invention includes a GPS antenna composed of a patch and a ground plane to receive high frequency satellite signals, an analog circuit which processes the high frequency satellite signals into a digital signal, a digital circuit which processes the digital signal to compute positional coordinates of the GPS antenna, and an interface connector which outputs the positional coordinates to an external device. A substrate is provided to support the GPS antenna, the analog circuit, the digital circuit, and the interface connector. An EMI (electromagnetic interference) shield is provided to shield at least the digital circuit to block a noise developing at the digital circuit from interfering with the GPS antenna. The characterizing feature of the present invention resides in that GPS antenna is mounted on the EMI shield to share the ground plane with the EMI shield, while keeping the patch insulated electrically from the EMI shield. Thus, the GPS receiver can be made compact by making the use of the EMI shield also as the ground plane of the antenna, while assuring to block the noise from interfering with the antenna and affording sufficient antenna gain with the increased area of the ground plane.

In a preferred embodiment, the substrate comprises a single double-sided circuit board having a top mount surface and a bottom mount surface. The digital circuit is formed by a plurality of components which are mounted partly on the top mount surface and partly on the bottom mount surface. The EMI shield is composed of a top cover fitted over the top mount surface and a bottom cover fitted over the bottom mount surface. The top cover and the bottom cover are cooperative to surround the components forming the digital circuit, thereby shielding the digital circuit completely. Most preferably, the top cover and the bottom cover are cooperative to surround also components forming the analog circuit for blocking any possible noise developed at the analog circuit.

The interface connector may be a universal serial bus (USB) connector for connection with a host computer. A universal serial bus (USB) controller for the USB connector is also included in the digital circuit shielded by the EMI shield so as not to radiate undesired noise towards the antenna.

The interface connector is surrounded by a connector shield which has a top end portion projecting above a top plane of the EMI shield. The top portion is electrically connected to the top plane so as to have an electrical potential substantially equal to the top plane, i.e., the ground plane of the EMI shield for assuring a stable antenna characteristic free from the interface connector. In order to assure the reliable and easy electrical coupling of the EMI shield to the connector shield, the EMI shield is formed with a lug or lugs which project above the top plane of the EMI shield and come into surface contact with the top end portion of the connector shield Preferably, the circuit board has a ground conductor embedded between the top mount surface and the bottom mount surface. The ground conductor is electrically connected to a plurality of pads arranged around a circumference of the circuit board. The EMI shield has a periphery corresponding to the circumference of the circuit board and has a plurality of anchors which are arranged around the periphery and bonded to the pads of the circuit board, respectively. The anchors are spaced from each other by a distance of one-fourth (¼) or less of a wavelength (λ) of the GPS signal. The distance is selected in order to block the noise from escaping through a gap between the circuit board and the EMI shield. Thus, the antenna can be completely kept intact from the noise developed at the digital and the analog circuits.

The top plane or the ground plane of the EMI shield is preferably configured into a regular polygon having four sides or more with the patch being mounted on the top plane at a location offset from the center of the regular polygon. This offset arrangement is advantageous for minimizing a loss in antenna gain when the GPS receiver is in use to be placed on a metal base. In this condition, the creepage distance from the patch to the metal base is an important factor with regard to the loss of the antenna gain. In principle, when the creepage distance from the patch to the metal base becomes nearly equal to one-fourth (¼) of the wavelength (λ) of the GPS signal, the antenna will suffer from a certain loss in the antenna gain. Therefore, as the number of such creepage distances of (λ/4) measured from various edge portions of the patch to the metal base increases, there will be a considerably increased loss in the antenna gain. This can be avoided by the offset arrangement of the patch on the ground plane of the regular polygon. That is, the patch give different creepage distances extending from various edge portions of the patch to the metal base through corresponding edges of the regular polygon and therefore can exclude a possibility where nearly all of the creepage distances would be λ/4. For this reason, it is possible with the offset arrangement of the patch to reduce the loss in the antenna gain when. the GPS antenna is placed on the metal base.

In this connection, a radome covering the GPS antenna is designed to have a bottom surface which is spaced from the patch by a distance longer than a critical distance below which a substantial loss in antenna gain appears.

Further, the EMI shield may be formed with a positioning structure for accurately positioning the patch on the top plane of the EMI shield, and therefore assuring reliable antenna characteristics as intended.

Also, when a feed cable is utilized to connect the patch to the analog circuit, the EMI shield may be formed with a retainer for retaining the feed cable in a fixed position for keeping the antenna characteristics as intended.

In another embodiment, a battery is incorporated in the GPS receiver to back up data stored in the memory included in the digital circuit. The battery is mounted on the EMI shield with a negative electrode of the battery being directly connected to the EMI shield, thereby simplifying a structure of connecting the battery in circuit.

Further, when the patch is connected to the analog circuit by a feed pin depending from the patch, the patch is preferably mounted at a located immediately upwardly of the analog circuit on the circuit board to minimize a connection path of the patch antenna to the analog circuit.

These and still other advantageous features of the present invention will become more apparent from the following description of the preferred embodiments when taking in conjunction with the attached drawings.

DETAILED DESCRIPTION OF THE PREFERRED EMBODIMENTS

Referring now to FIGS. 1 to 6, there is shown a disk-type GPS receiver in accordance with a preferred embodiment of the present invention. The GPS receiver 1 includes a GPS antenna 10 receiving high frequency (HF) satellite signals from a plurality of satellites orbiting around the earth, and a signal processing unit for computing positional coordinates of the GPS antenna in a known manner based upon the received satellite signals including location data as well as time data of the respective satellites.

Figure 6:
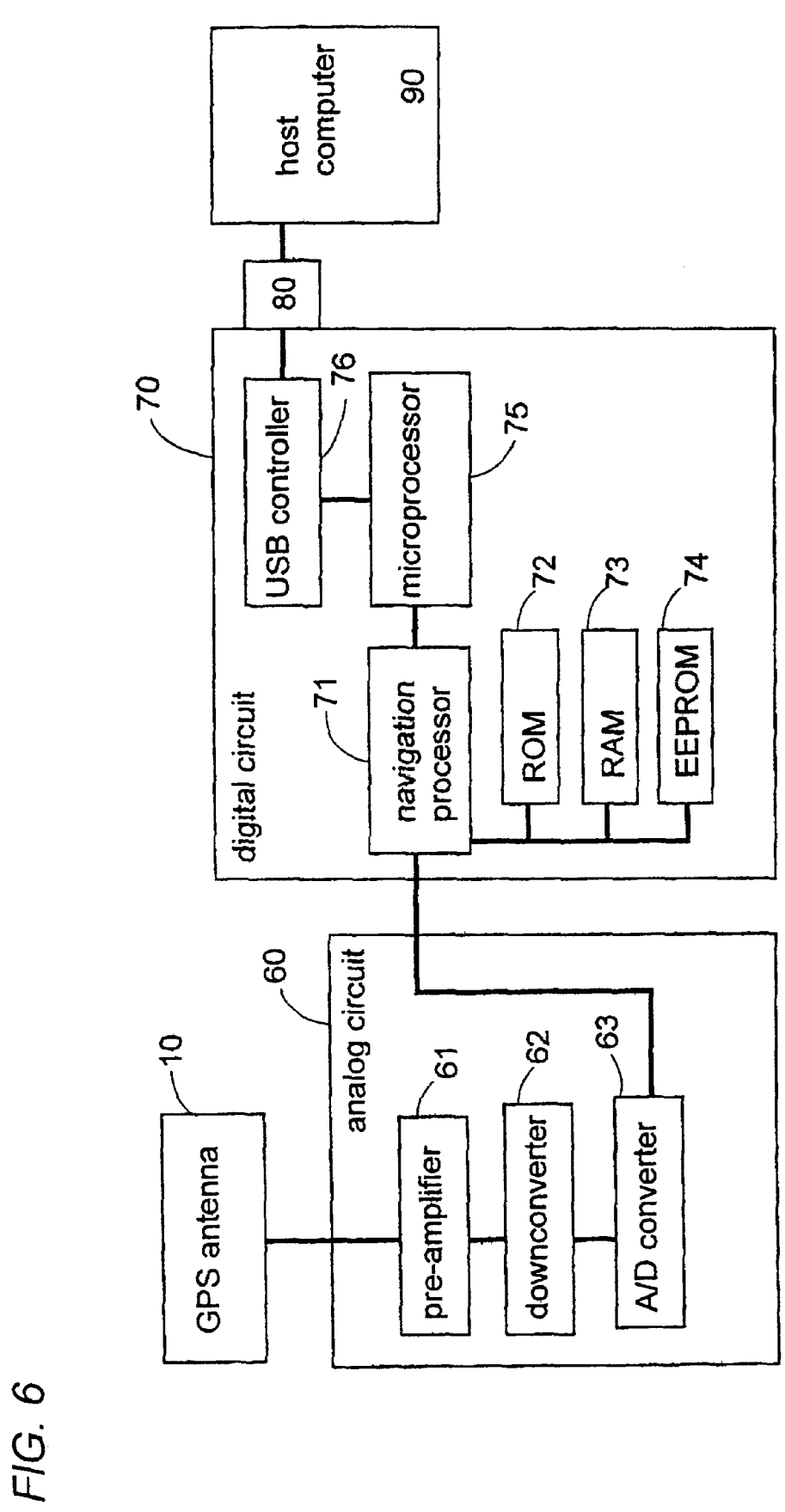
FIG. 6 is a circuit diagram of the GPS receiver.

As shown in FIG. 6, the processing unit is basically composed in function of an analog circuit 60, and a digital circuit 70. The analog circuit 60 has a pre-amplifier 61 which amplifies the HF satellite signals, a downconverter 62 which reduces the HF signals into intermediate frequency (IF) signals, and an A/D converter or digitizer 63 which converts the IF signals into digital signals. The digital circuit 70 comprises a navigation processor 71 for processing the digital signals to compute positional coordinates of the GPS receiver, ROM 72 storing a program of computing the positional coordinates, RAM 73 storing the computed positional coordinates, and EEPROM 74 storing orbital data of the satellites as well as the updated positional coordinates. Also included in the digital circuit 70 are a microprocessor 76 and a universal serial bus (USB) controller 76 for intercommunication with a host computer 90 through a universal serial bus (USB) connector 80. The USB controller 76 is provided for transferring the data and instructions under control of the microprocessor 75 between the digital circuit and the host computer 90 in a prescribed format. The USB connector 80 receives a USB plug 92 at one end of a cable 91 leading to the computer. The computer 90 obtains the positional coordinates from the digital circuit 70 of the GPS receiver 1 for mapping or the like processing.

Figure 1:
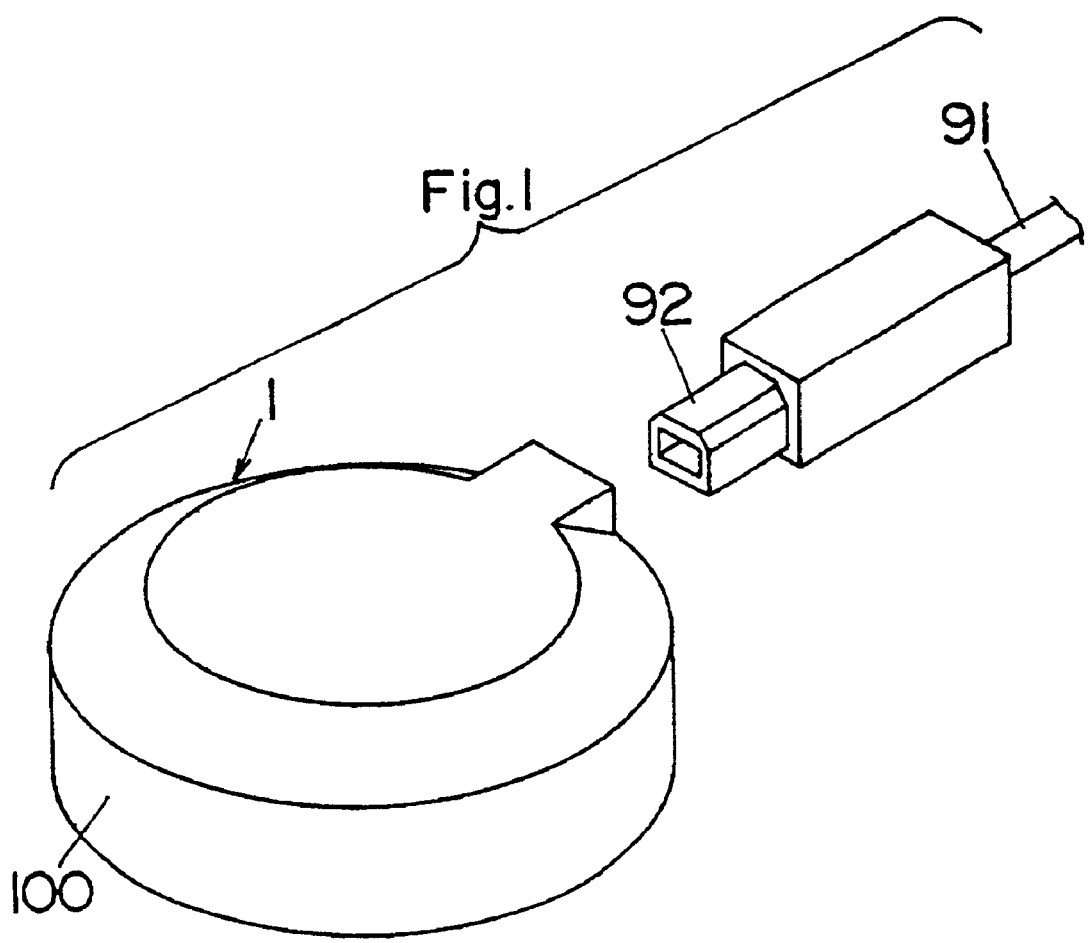
FIG. 1 is a perspective view of a disk-type GPS receiver in accordance with a preferred embodiment of the present invention.
Figure 2:
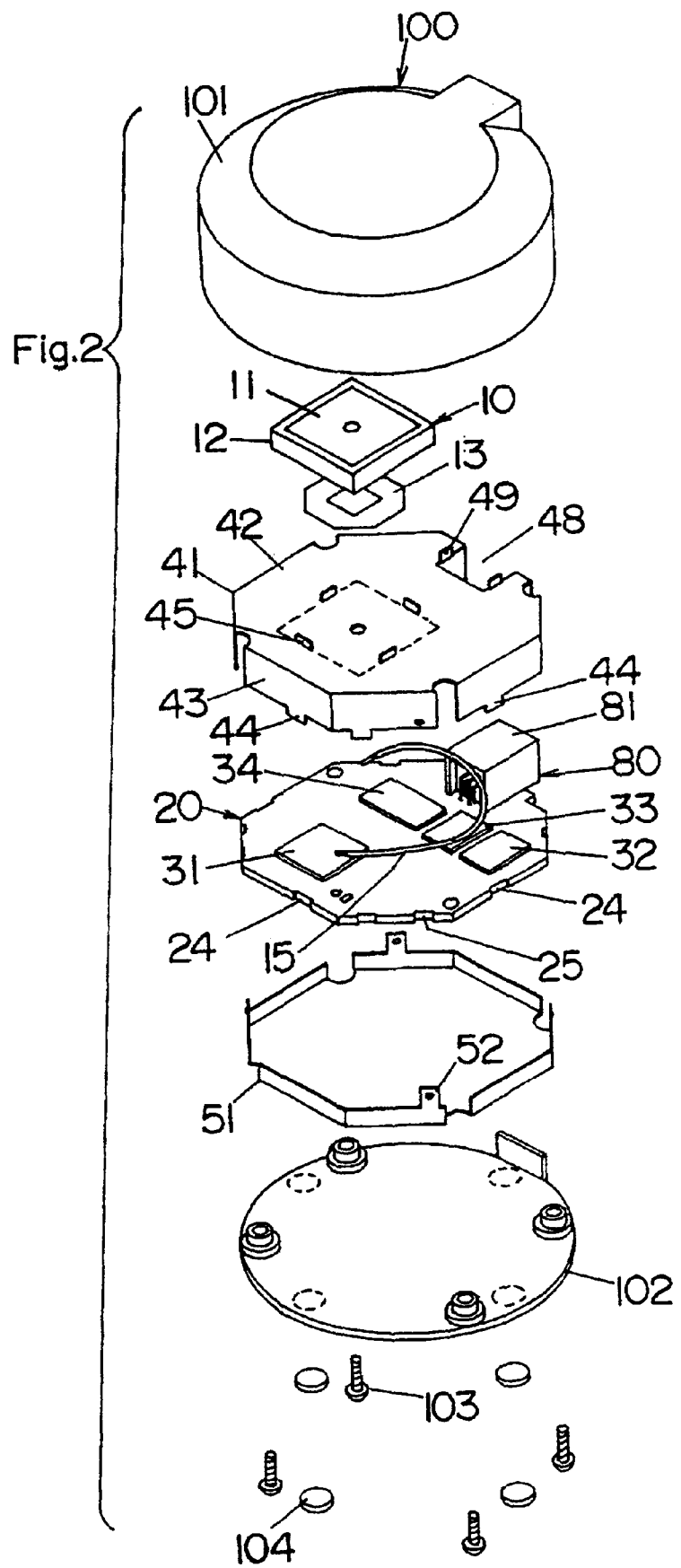
FIG. 2 is an exploded perspective view of the GPS receiver.
Figure 5:
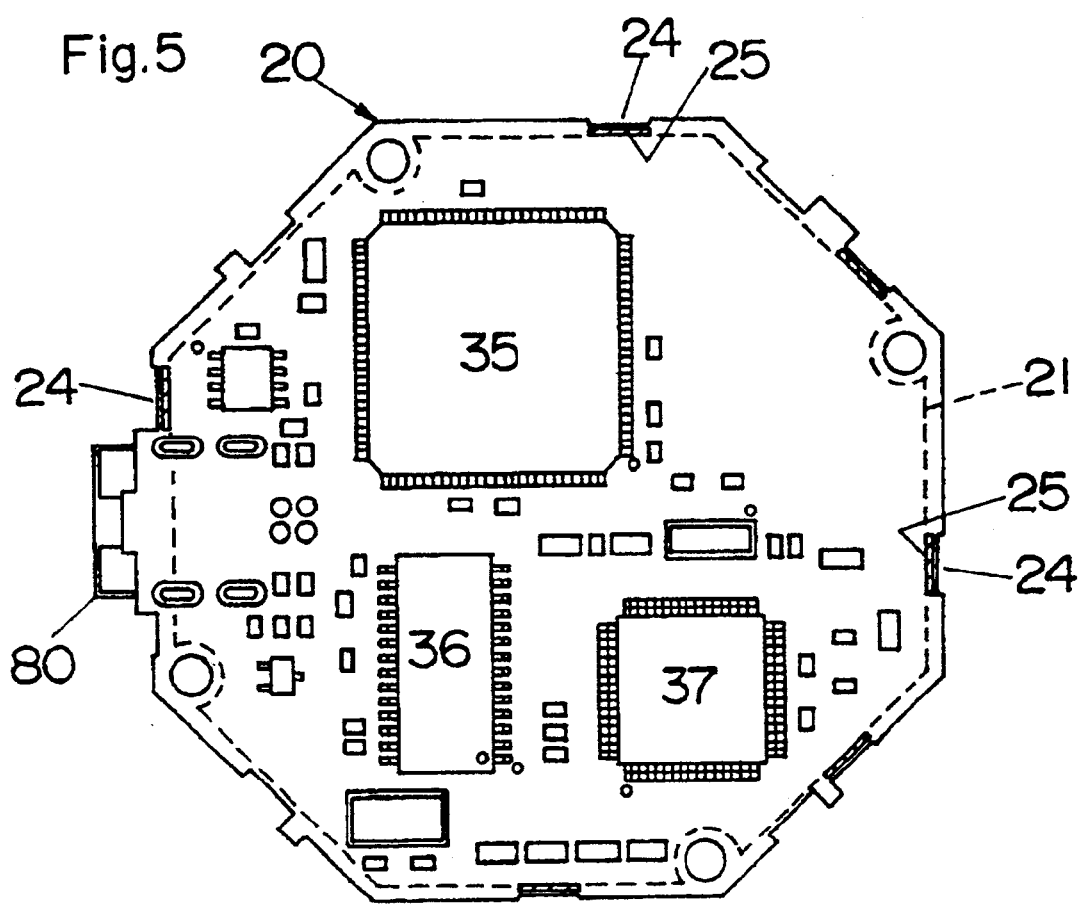
FIG. 5 is a bottom view of a circuit board utilized in the GPS receiver.

As best shown in FIGS. 2 and 5, the processing unit, i.e., the analog and digital circuits are formed by a plurality of electric components which are mounted on a single circuit board 20. The circuit board 20 is a double-sided board with a top mount surface, a bottom mount surface, and an intermediate layer of a ground conductor 21 which is embedded in the board 20 to serve as a ground for the electrical circuits, i.e., the analog and digital circuits 60 and 70. The components includes as major components, IC chips 31 to 37 which are partly mounted on the top mount surface and partly on the bottom mount surface. The components forming the digital circuit include chips 32 to 37 and the associated circuitry on the opposite sides of the circuit board 20, while components forming the analog circuit include the chip 31 and the associate circuitry on the opposite sides of the circuit board 20. The board 20 is shaped into a regular octagon and carries the USB connector 80 at a center of one side of the octagon. The USB connector 80 is surrounded by a connector shield 81 which is also connected to the ground conductor 21.

Figure 3:
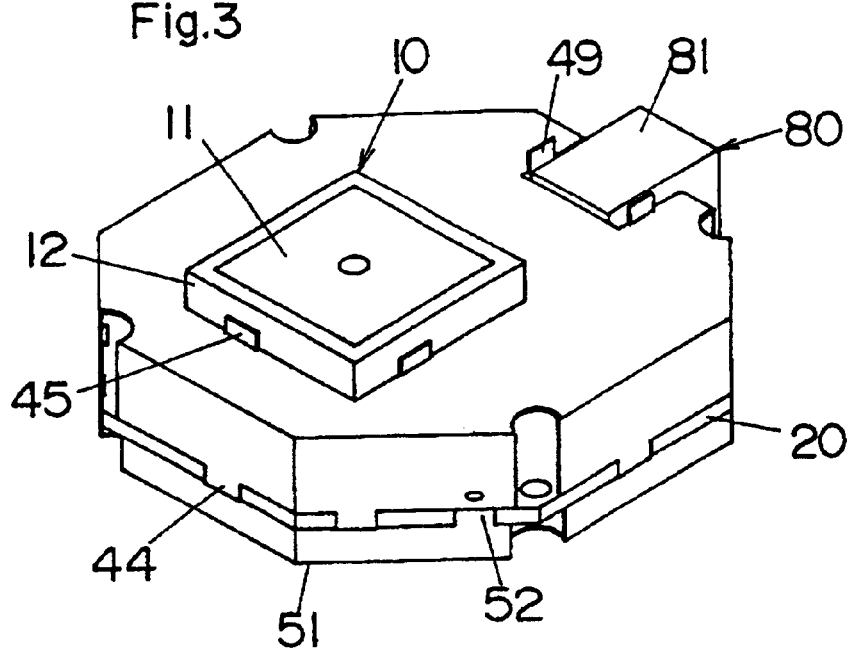
FIG. 3 is a perspective view of the GPS receiver shown with a radome removed therefrom.

The circuit board 20 is covered by an EMI (electromagnetic interference) shield 40 to shield the analog and digital circuits for blocking noises developing at the circuits from interfering with the GPS antenna 10. The EMI shield 40 is composed of a top cover 41 and a bottom cover 51 which are respectively shaped to have flat planes of regular octagons in conformity with the circuit board 20. The top cover 41 includes a peripheral wall 43 depending from a periphery of the top octagonal flat plane 42 to abut against the circumference of the circuit board 20, as shown in FIG. 3. A plurality of anchors 44 extend integrally from the peripheral wall 43 and engage respectively into corresponding notches 24 in the circumference of the circuit board 20 for fixing the top cover 41 to the circuit board 20. The bottom cover 51 also includes a peripheral wall with a plurality of joints 52 which extend through corresponding recesses 25 in the circumference of the circuit board 20 for soldering connection to the peripheral wall 43 of the top cover 41. Although the EMI shield 40 is designed to shield the analog and digital circuits in this embodiment, the shield 40 may be sufficient to shield only the digital circuit which are a major source of develops the noises interfering with the receiving characteristic of the antenna.

Figure 4:
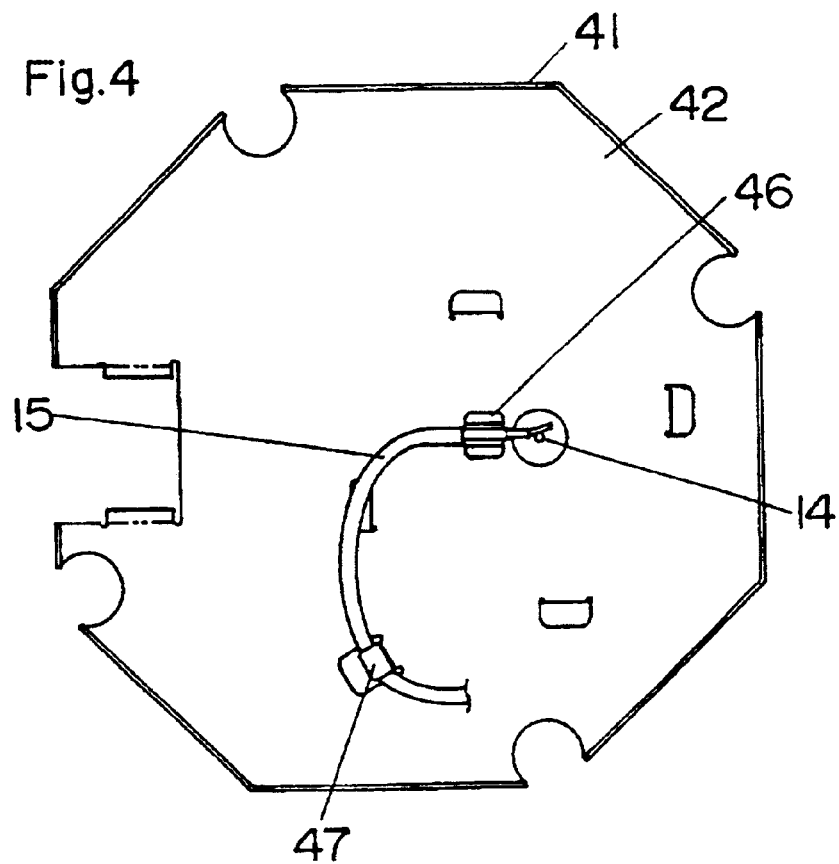
FIG. 4 is a bottom view of a top cover of an EMI shield utilized in the GPS receiver.

The top flat plane 42 of the top cover 41 is utilized also to define a ground plane of the GPS antenna 10, in addition to the function of shielding the analog and digital circuits. That is, as shown in FIGS. 2 and 3, the GPS antenna 10 is composed of a patch 11 supported on a dielectric ceramics 12 and the ground plane 42. The patch 11 is shaped into a rectangular having lengths of about 20 to 22 mm which are approximately equal to one-half of a wavelength of 1,575.42 MHz, a center frequency of the high frequency satellite signals. A plurality of positioning flaps 45 project on the top flat plane 42 to engage the exterior of the dielectric ceramics 12 for positioning the patch 11 at an accurate position on the plane 42. The ceramics 12 is then secured to the plane 42 by means of an adhesive tape 13. The patch 11 is connected to the component forming the analog circuit by means of a coaxial cable 15 having a core and a shield conductor, As shown in FIG. 4, the core and the shield conductor are connected at one end of the coaxial cable 15 respectively to a feed pin 14 and soldering catches 46 on the back of the ground plane 12. The coaxial cable 15 is retained at a fixed position on the back of the top cover 41 by means of a retainer flap 47 integrally formed on the top cover 41 to keep uniform antenna characteristics.

The ground plane 42 has a cut out portion 48 for receiving the connector shield 81 which has a greater height than the top cover 41. A pair of upstanding lugs 49 are formed to extend from the cut out portion for electrical connection with a top end of the connector shield 81 of the USB connector 80, giving the same electrical potential to the top surface of the connector shield and the ground plane 42 for assuring consistent antenna characteristics irrespective of the existence of the connector shield 81 projecting on the ground plane 42.

The GPS antenna 10 thus integrated on the EMI shield 40 is accommodated within a radome 100 of an electrically insulating material. The radome 100 is disk-shaped to have a circular contour and is composed of a top case 101 and a bottom case 102 which are fastened by means of screws 103 extending also through the circuit board 20 and the EMI shield 40. Whereby, the antenna 10 and the processing unit are assembled into a single structure. The bottom case 102 is provided with a plurality of rubber feet 104 by which the GPS receiver 1 is placed in use on a supporting structure.

Figure 7:
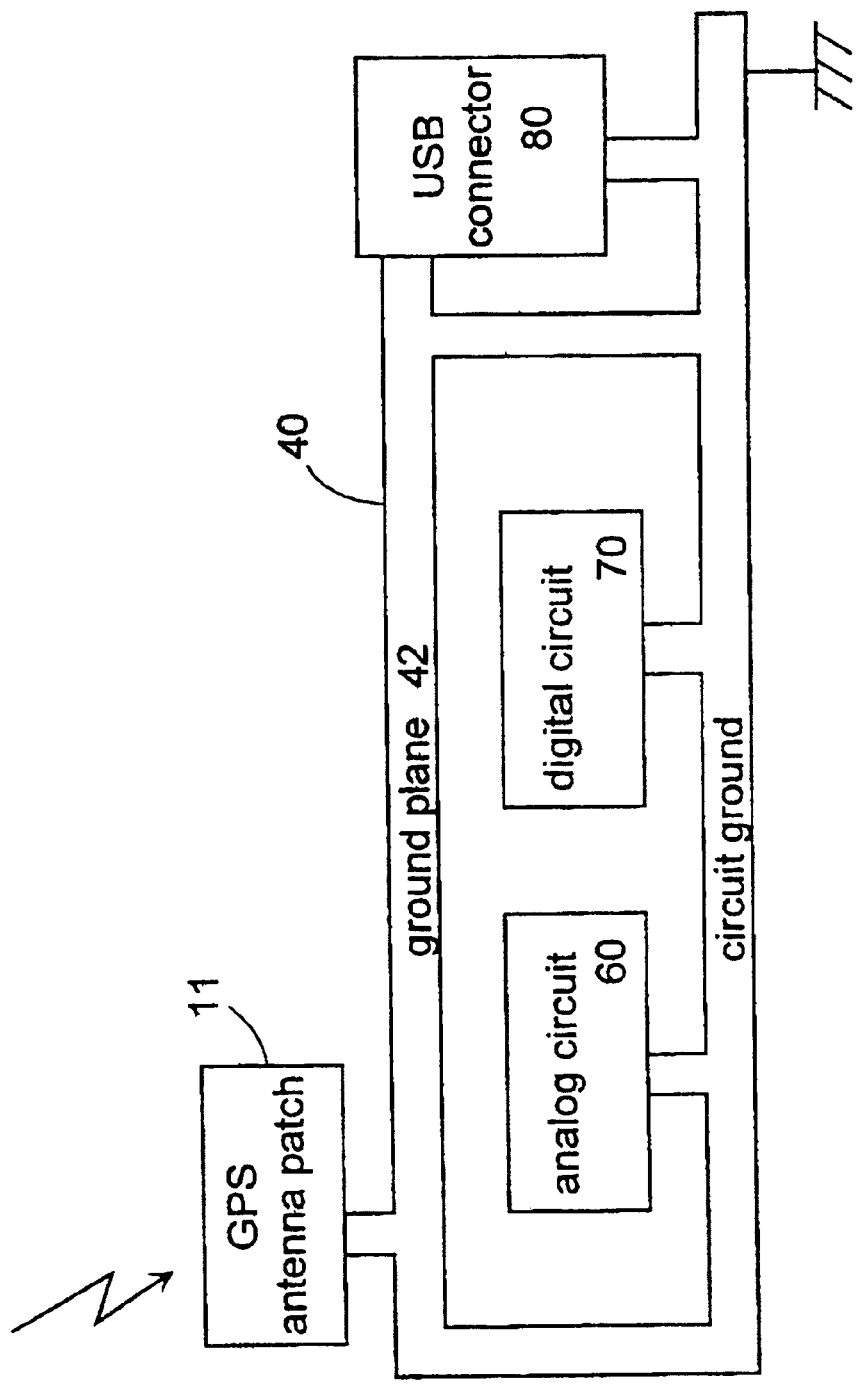
FIG. 7 is a diagram illustrating the feature of the GPS receiver.
Figure 8:
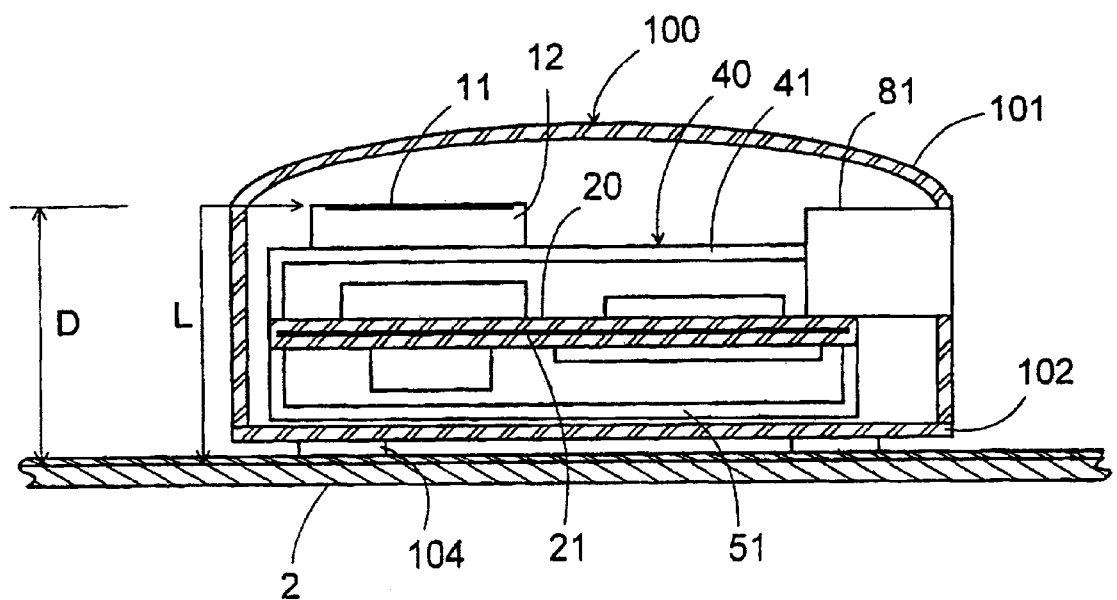
FIG. 8 is a view of the GPS receiver showing a distance (D) between the antenna and a metal base on which the receiver is placed in use.

In the GPS receiver 1 thus assembled, the EMI shield 40 is best utilized also to define the ground plane 42 of the antenna 10 in addition to the circuit ground, as shown in FIG. 7. Therefore, the GPS receiver 1 including the antenna and the signal processing unit can be made compact enough to be sufficiently portable, while leaving the antenna free from the noises developed at the signal processing unit.

The EMI shield 40 is electrically connected to the ground conductor or the circuit ground 21 by soldering the anchors 44 respectively to a corresponding number of pads 25 which are provided at the bottom circumference of the circuit board 20, as shown in FIG. 5, and connected to the ground conductor 21. It is noted in this connection that, the distance between the adjacent anchors 44 or the pads 25 are equal to or shorter than a distance which is one-fourth (¼) of the wavelength of the satellite signal in order to effectively minimize noise leakage outside of the EMI shield 40.

Further, as shown in FIG. 3, the patch 11 of the GPS antenna 10 is offset from a center of the octagonal ground plane 42 in order to give different creepage distances L from various edge portions of the patch 11 to a metal base 2 on which the GPS receiver 1 is possibly placed in an actual condition of use, for minimizing a loss in antenna gain in such use. In principle, when the creepage distance from the patch 11 to the metal base 2 becomes nearly equal to one-fourth (¼) of the wavelength (λ) of the GPS signal, the antenna will suffer from a certain loss in the antenna gain. Therefore, as the number of such creepage distances of (λ/4) measured from various edge portions of the patch 11 to the metal base 2 increases, there will be a considerably increased loss in the antenna gain. This can be avoided by the offset arrangement of the patch 11 on the ground plane of the regular octagon. That is, the patch 11 give different creepage distances L extending from various edge portions of the patch 11 to the metal base 2 through corresponding edges of the octagon and therefore can exclude a possibility where nearly all of the creepage distances would be λ/4. For this reason, it is possible with the offset arrangement of the patch to minimize the loss in the antenna gain when the GPS receiver is placed on the metal base.

Figure 9:
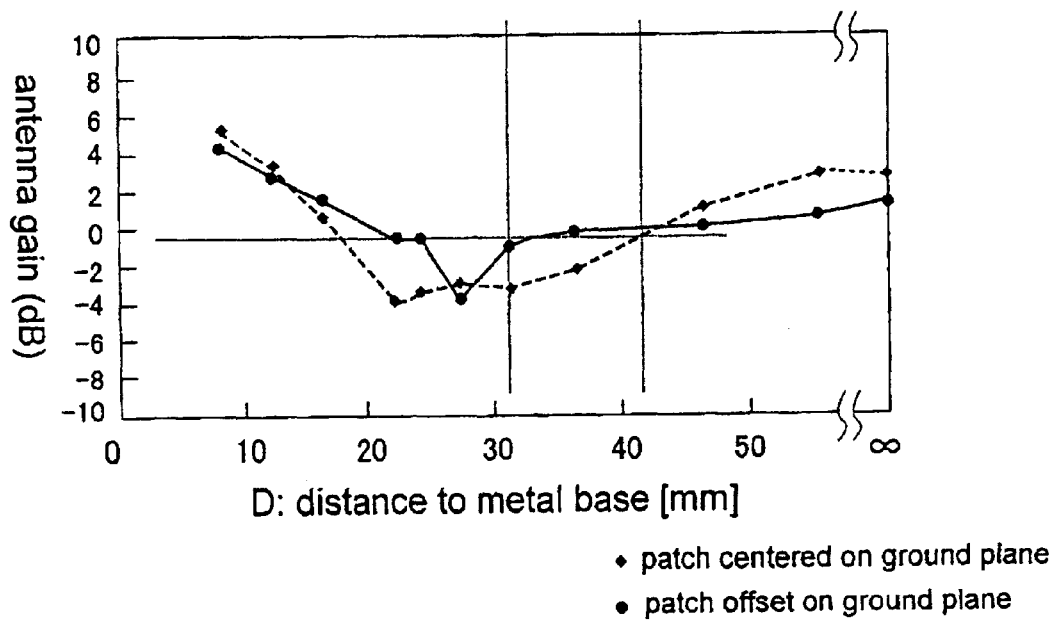
FIG. 9 is a graph illustrating the relation between an antenna gain (dB) and the distance (D)

FIG. 9 illustrates the antenna gain [dB] with varying distance D from the patch 11 to the metal base 2 for comparison between the embodiment (indicated by round dots) in which the patch 11 is offset from the center of the octagonal ground plane 42 and a case (indicated by square dots) in which the patch is centered on the ground plane. As demonstrated in FIG. 9, a drop in the antenna gain below 0 dB appears over a longer range of the distance D (18 mm<D<42 mm) for the patch centered on the ground plane, while the like drop appears only over a shorter range of the distance D (25 mm<D<32 mm) for the offset patch. This means that the GPS receiver 1 of the present embodiment can have sufficient antenna gain only by spacing the patch away from the metal base by at least 32 mm, in contrast to the antenna with the centered patch where sufficient gain is promised by spacing the patch away from the metal base by as long as 42 mm. Therefore, the GPS receiver 1 of the present embodiment can be made into a low-profile structure while assuring the sufficient antenna gain even placed on the metal base. In practice, the distance D between the patch 11 and the bottom of the radome 100 is selected to be as less as 32 mm which is a critical distance below which a undesired antenna gain loss appears.

It is noted in this connection that, although the EMI shield 40 having the octagonal ground plate 42 is utilized in the illustrated embodiment, the present invention is not limited to the use of the octagonally shaped EMI shield and the correspondingly shaped circuit board 20, and may use the EMI shield 40 and the circuit board of regular polygon having at least four sides or of circular configuration.

Figure 10:
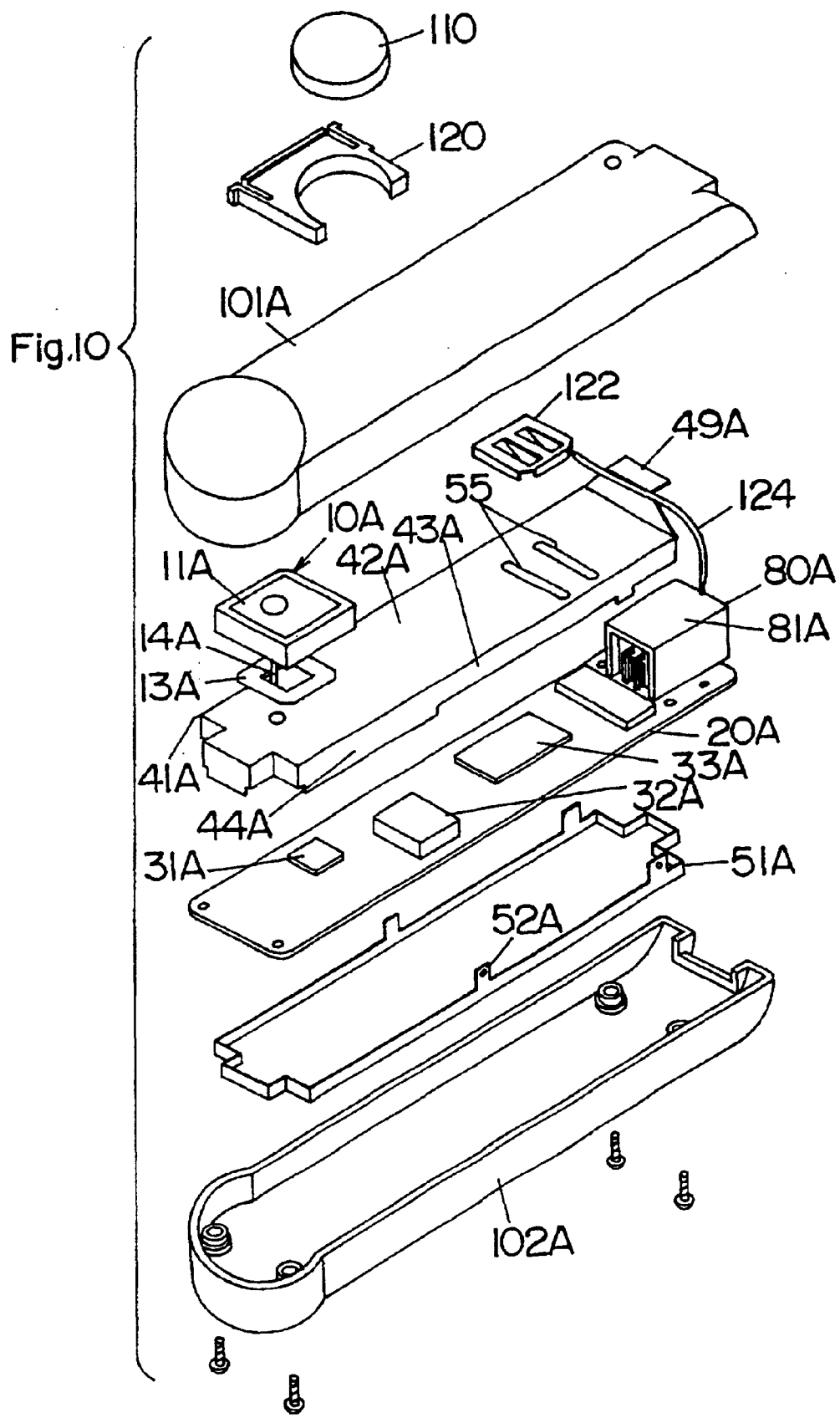
FIG. 10 is an exploded perspective view of a stick-type GPS receiver in accordance with another preferred embodiment of the present invention.
Figure 11:
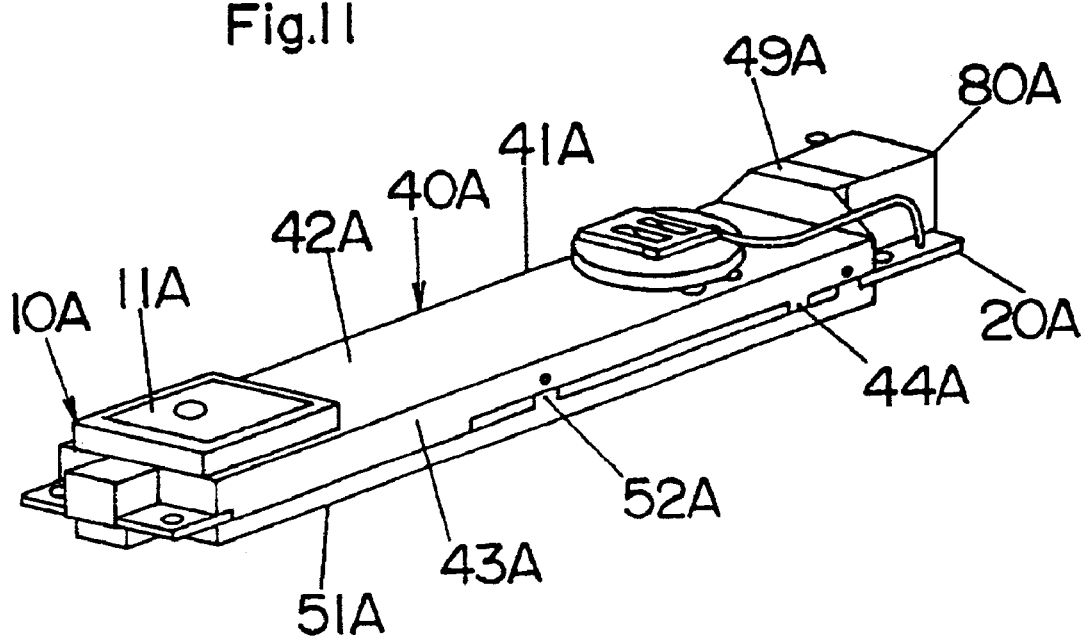
FIG. 11 is a perspective view of the GPS receiver shown with a radome removed therefrom.
Figure 12:
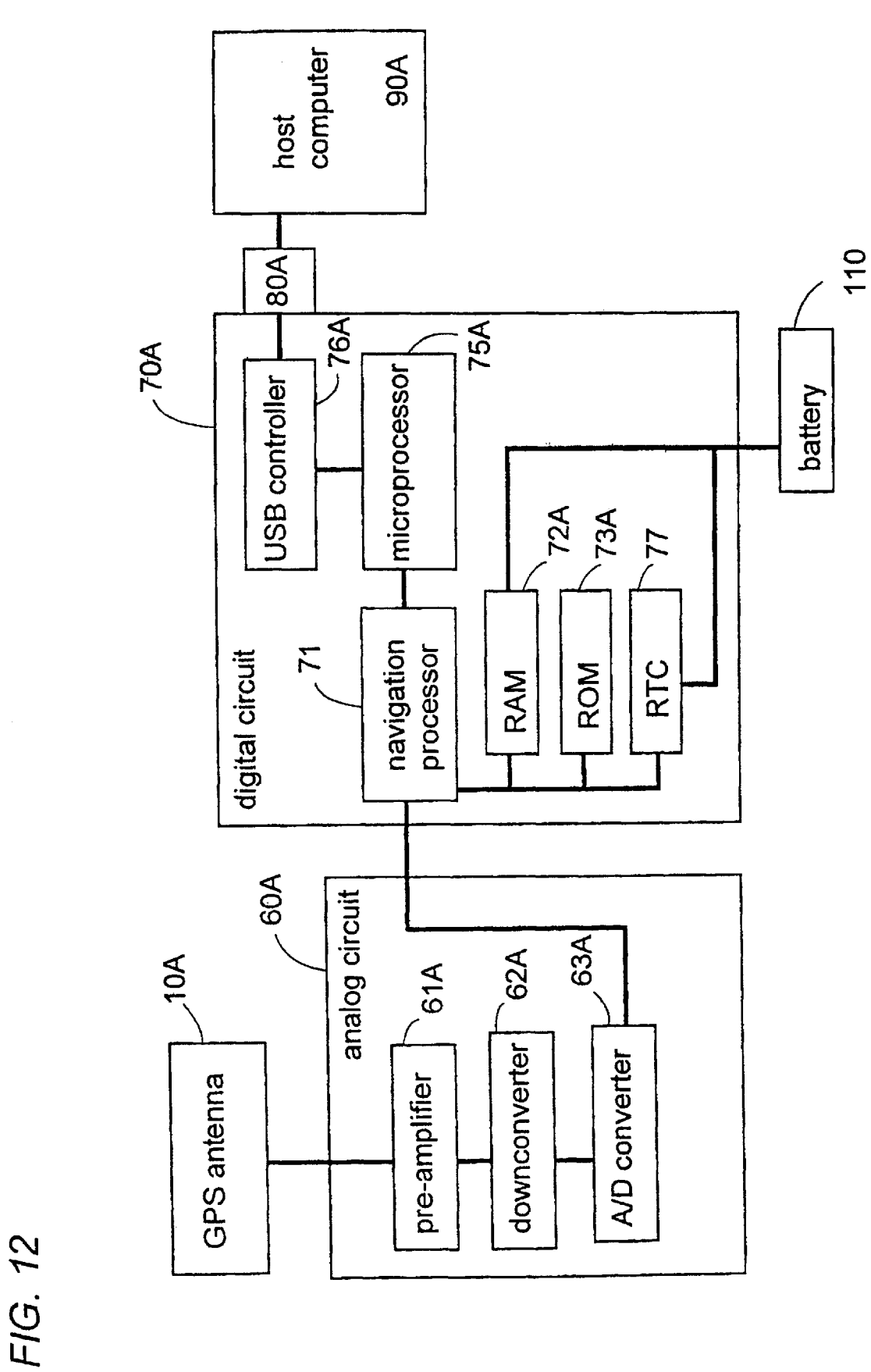
FIG. 12 is a circuit diagram of the stick-type GPS receiver.

FIGS. 10 to 12 show a stick-type GPS receiver 1A in accordance with another preferred embodiment of the present invention. The GPS sensor 1A is identical in function to the previous embodiment except for the shape of an EMI shield 40A and the associated components and for an inclusion of a back-up battery 110. Like parts are designated by like reference numerals with a suffix letter of 'A'. Components 31A to 34A forming the analog circuit 60A as well as the digital circuit 70A and a USB connector 80A are mounted on a double-sided circuit board 20A of an elongated rectangular configuration. The EMI shield 40A is also shaped into a rectangular configuration in conformity with the circuit board 20A and is composed of a top cover 41A and a bottom cover 51A. The top cover 41A has a rectangular flat top plane 42A which carries thereon a patch 11A and defines a ground plane for the antenna 10A. The patch 11A is supported on a dielectric ceramics 12A which is secured to one end of the ground plane 42A by means of an adhesive tape 13A, and which is connected to the analog circuit by means of a feed pin 14A depending from the patch 11A. The analog circuit is formed on one end of the circuit board 20A at a location immediately below the patch 11A for easy connection thereto while avoiding an extra connection line which would impede the antenna characteristics.

The top cover 41A covers the entire top mount surface of the circuit board 20A and is electrically connected to a like ground conductor (not shown) embedded in the circuit board 20A by means of anchors 44A depending from a peripheral wall 43A of the top cover 41A. The bottom cover 51A also covers the entire bottom mount surface of the circuit board 20A and is electrically connected to the top cover 41A by means of joints 52A. The top cover 41A is formed at its one lengthwise end with an extension 49A which overlaps on a top end of a connector shield 81A of the USB connector 80A for electrical interconnection therebetween. The circuit board 20A and the EMI shield 40A carrying the antenna are assembled into a single structure together with a radome 100A composed of a top case 101A and a bottom case 102A.

The back-up battery 110 is provided to back-up the data, i.e., the positional coordinates computed at the navigation processor 71A and stored in RAM 72A, as well as to supply an operating voltage to a real time clock (RTC) 77 included in the digital circuit 70A to compute the positional coordinates. The battery 110 is retained in a holder 120 which is detachable to the top case 101A. When the holder 120 is attached to the top case 101A, a negative electrode of the battery 110 comes into a direct contact with ridges 55 on the top surface 42A of the EMI shield 40A, while a positive electrode of the battery comes into electrical contact with a terminal 122 provided on the back of the top case 101A. The terminal 122 is connected to the digital circuit on the circuit board 20A through a lead 124, thus establishing the electric path of feeding the voltage of the battery to the digital circuit. Thus, the battery can be electrically connected to the digital circuit by utilizing the EMI shield also as a conductor of connecting the negative electrode of the battery to the circuit ground.

What is claimed is:

1. A GPS receiver comprising:
   a GPS antenna receiving high frequency satellite signals, said antenna comprising a patch and a ground plane;
   an analog circuit attached to a substrate that receives the high frequency satellite signal from the GPS antenna and processes said high frequency satellite signals into a digital signal;
   a digital circuit attached to the substrate that receives the digital signal from the analog circuit and processes said digital signal to compute positional coordinates of said GPS antenna;
   an interface connector attached to the substrate that receives the positional coordinates and outputs said positional coordinates to an external device; and
   an EMI (electromagnetic interference) shield which surrounds said substrate as well as at least said digital circuit on said substrate to block a noise developing at said digital circuit from interfering with said GPS antenna,
   said GPS antenna being directly mounted on said electromagnetic interference shield so as to define said ground plane only by said electromagnetic interface shield, said patch being electrically insulated from said electromagnetic interference shield.

2. The GPS receiver as set forth in claim 1, wherein
   said substrate comprises a single double-sided circuit board having a top mount surface and a bottom mount surface, said digital circuit being formed by a plurality of components which are mounted partly on said top mount surface and partly on said bottom surface,
   said EMI shield is composed of a top cover fitted over said top mount surface and a bottom cover fitted over said bottom mount surface, said top cover and said bottom cover being cooperative to surround the components forming said digital circuit.

3. The GPS receiver as set forth in claim 1, wherein
   said interface connector comprises a universal serial bus (USB) connector, and said digital circuit includes a universal serial bus (USB) controller for said USB connector.

4. The GPS receiver as set forth in claim 2, wherein
   said top cover and said bottom cover are cooperative to surround the components forming said analog circuit.

5. The GPS receiver as set forth in claim 1, wherein
   said interface connector is surrounded by a connector shield which has a top end portion projecting above a top plane of said EMI shield, said top end portion being electrically connected to said top plane so as to have an electrical potential substantially equal to the top plane of said EMI shield.

6. The GPS receiver as set forth in claim 5, wherein
   said EMI shield is formed with a lug which projects above the top plane of said EMI shield and comes into surface contact with the top end portion of said connector shield.

7. The GPS receiver as set forth in claim 1, wherein
   said substrate includes a ground conductor for said analog circuit and said digital circuit, and said EMI shield has a periphery which is electrically connected to said ground conductor at points spaced by a distance of one-fourth (¼) of a wavelength of said satellite signal or less.

8. The GPS receiver as set forth in claim 2, wherein
   said circuit board has a ground conductor embedded between said top mount surface and said bottom mount surface, said ground conductor being electrically connected to a plurality of pads provided at a circumference of said circuit board,
   said EMI shield having a periphery corresponding to the circumference of said circuit board and having a plurality of anchors which are arranged around the periphery and bonded to said pads of the circuit board, respectively and
   said anchors being spaced from each other by a distance of one-fourth (¼) of a wavelength of said GPS signal or less.

9. The GPS receiver as set forth in claim 1, wherein
   said EMI shield has a top plane which is configured into a regular polygon having four sides or more,
   said patch being mounted on said top plane at a location offset from the center of said regular polygon.

10. The GPS receiver as set forth in claim 9, wherein
    a radome is provided to cover said GPS antenna, said EMI shield, said analog circuit, and said digital circuit, said radome having a bottom surface which is spaced from said patch by a distance longer than a critical distance below which a substantial loss in antenna gain appears.

11. The GPS receiver as set forth in claim 1, wherein said EMI shield is formed with a positioning structure for accurately positioning said patch on the top plane of said EMI shield.

12. The GPS receiver as set forth in claim 1, wherein said patch is electrically connected to said analog circuit through a feed cable, and said EMI shield is formed with a retainer for retaining said feed cable in a fixed position.

13. The GPS receiver as set forth in claim 1, wherein said digital circuit includes a memory storing data with regard to the computation of said positional coordinates, said data being backed up by a battery, said battery being mounted on said EMI shield with a negative electrode of said battery being electrically connected directly to said EMI shield.

14. The GPS receiver as set forth in claim 1, wherein said patch is mounted on said EMI shield at a location immediately upward of said analog circuit on said substrate and is connected to said analog circuit by means of a feed pin depending from said patch.

15. A GPS receiver comprising:

a GPS antenna receiving high frequency satellite signals, said antenna comprising a patch and a ground plane;

an analog circuit attached to a substrate that receives the high frequency satellite signal from the GPS antenna and processes said high frequency satellite signals into a digital signal;

a digital circuit attached to the substrate that receives the digital signal from the analog circuit and processes said digital signal to compute positional coordinates of said GPS antenna;

an interface connector attached to the substrate that receives the positional coordinates and outputs said positional coordinates to an external device;

an electromagnetic interference shield formed from a metal into a housing which surrounds said substrate as well as at least said digital circuit on said substrate to block a noise developing at said digital circuit from interfering with said GPS antenna, said GPS antenna being directly supported on the electromagnetic interference shield so as to define said ground plane only by said electromagnetic interface shield, said patch being electrically insulated from said electromagnetic interference shield.

* * * * *